June 22, 1954     M. H. ROTTERSMANN     2,681,801
PNEUMATIC SUSPENSION
Filed Jan. 6, 1950                       3 Sheets-Sheet 1
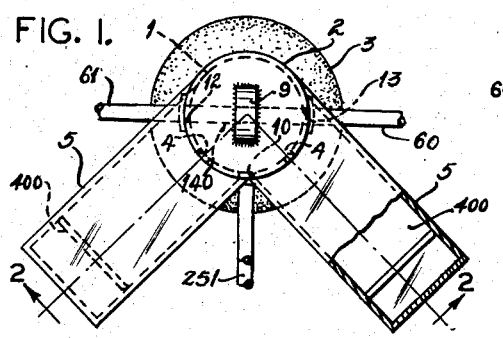
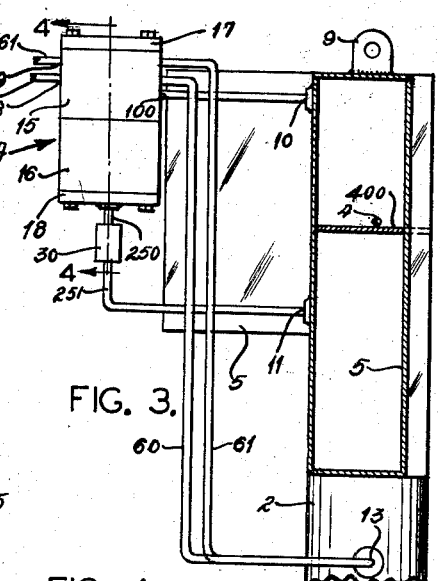
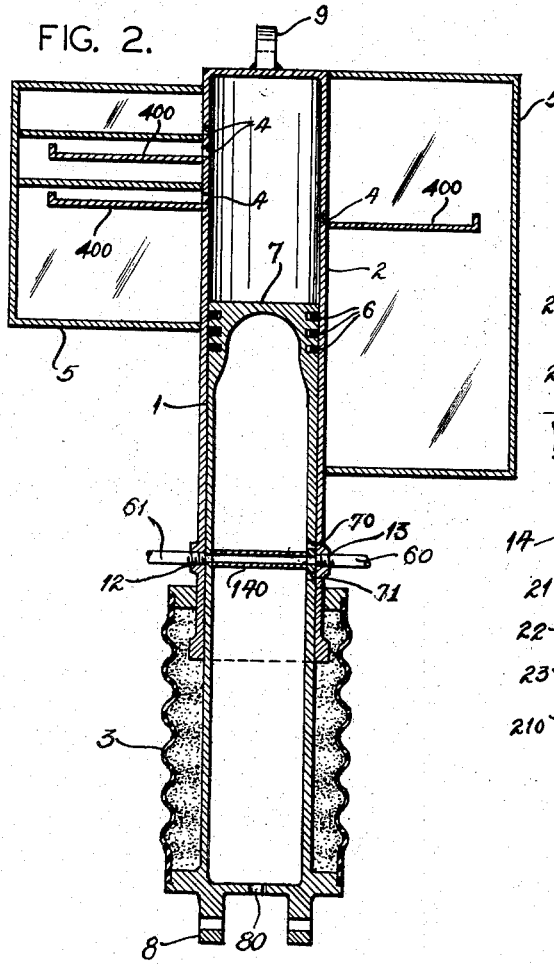
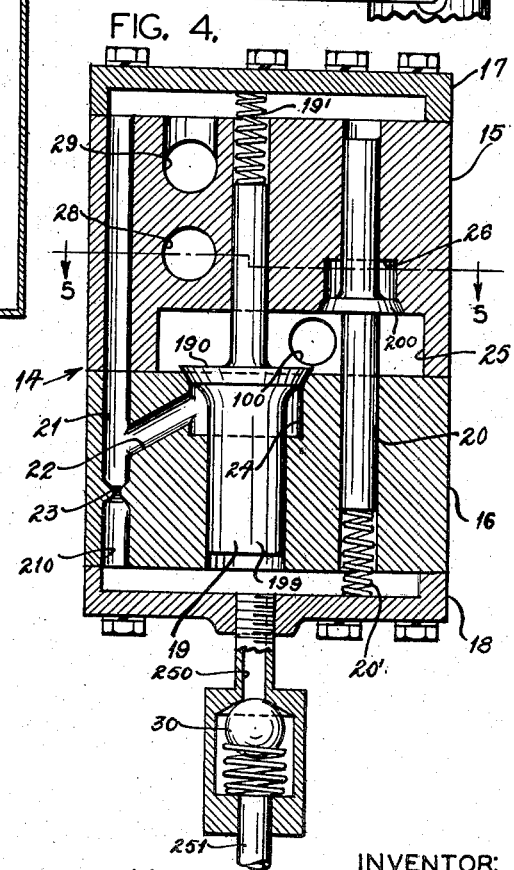
INVENTOR:
MAURICE H. ROTTERSMANN
BY *Breuninga & Sutherland*
ATTORNEYS.

June 22, 1954 — M. H. ROTTERSMANN — 2,681,801
PNEUMATIC SUSPENSION
Filed Jan. 6, 1950 — 3 Sheets-Sheet 2

INVENTOR:
MAURICE H. ROTTERSMANN
ATTORNEYS.

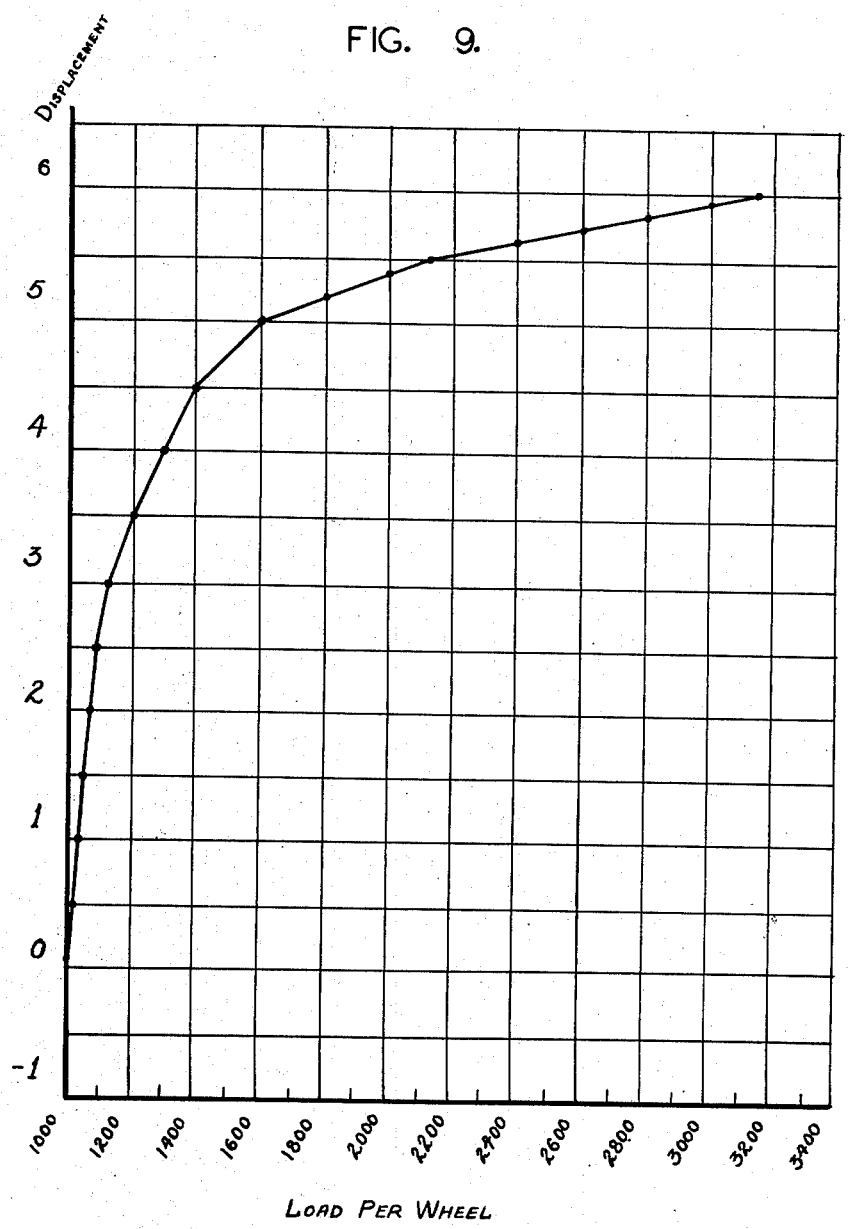

Patented June 22, 1954

2,681,801

UNITED STATES PATENT OFFICE 2,681,801

PNEUMATIC SUSPENSION

Maurice H. Rottersmann, Webster Groves, Mo.

Application January 6, 1950, Serial No. 137,069

6 Claims. (Cl. 267—65)

This invention relates generally to pneumatic suspensions, and particularly to pneumatic suspensions for wheeled vehicles.

Wheel suspensions in use heretofore have been most frequently of the steel spring type, either leaf or coil springs being used to protect the vehicle and its occupants by cushioning the shocks of the road. Steel and rubber torque-type assemblies are also known. One of the principal difficulties with leaf, coil and torque-type steel springs, and corresponding rubber suspensions, is the fact that their degree of flexure available for shock absorption is decreased as the static load increases. This has lead to the dilemma that, in order to prevent excessive downward displacement by a static load, the spring rate of suspensions heretofore known must often be made too high for comfort, or, if the spring rate of the suspension is made low enough for comfort, the body of the vehicle stands undesirably high above the wheels and the ground when not under static load. This is particularly true of the relatively light vehicles having a large capacity, which are becoming more common. The term "spring rate" is used in the specification and claims in the sense in which it is used in the article "Modern Passenger Car Ride Characteristics," by R. Schilling and H. O. Fuchs, Journal of Applied Mechanics, p. A-59, June 1941—that is, as the frequency of motion of a suspension.

In order to provide maximum comfort to the occupants of a wheeled vehicle, the suspension employed must have a low spring rate through a normal operating range. From a practical standpoint, it is necessary to avoid excessive size of the suspension, height of the vehicle from the ground, and "bounce" of the vehicle. It is further necessary to provide means for effectively increasing the suspension's spring rate as the unsprung portion of the vehicle approaches the sprung portion, to avoid injury to the suspension, the vehicle, and the occupants when the suspension reaches the limit of its travel.

One of the objects of the present invention is to provide a sturdy, simple type of pneumatic suspension system in which the available vertical travel of the unsprung portion of the vehicle may be made independent of the static load, and the spring rate of the suspension may be made predeterminably variable. Other objects will become apparent to those skilled in the art when the following description is read in connection with the accompanying drawings, in which:

Figure 1 is a plan view of a suspension unit according to one embodiment of this invention;

Figure 2 is a sectional view taken along a line 2—2 of Figure 1;

Figure 3 is a side view, partly cut away, of a suspension unit as shown in Figures 1 and 2, in connection with one embodiment of leveling valve;

Figure 4 is a sectional view taken along a line at 4—4 of the illustrative embodiment of leveling valve shown in Figure 3;

Figure 9 is a graph showing displacement of the piston of one of the suspension units of this invention against force.

Figure 5:
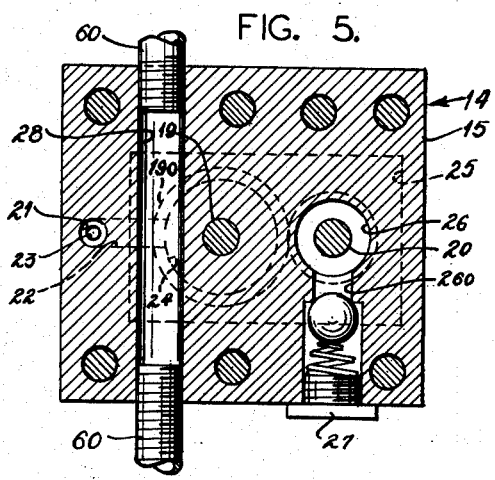
Figure 5 is a sectional view taken along line 5—5 of Figure 4.

According to the present invention, generally stated, a simple, sturdy, pneumatic suspension system is provided, in which the rate of vertical travel of the unsprung portion of a wheeled vehicle may be made very nearly linear with respect to the force exerted on it, through a predetermined and uniform operating range, regardless of the static load thereon, but which rate of travel is decreased quickly but at a predeterminable rate as the suspension approaches the limit of its travel toward the sprung portion of the vehicle. The converse is also true, that in traveling away from the sprung portion of the vehicle, the unsprung portion has initially a high spring rate which decreases until the normal operating range is reached. The suspension unit itself consists of a piston acting in a main cylinder connected by ports in the cylinder wall to auxiliary chambers. These cylinder wall ports are covered progressively as the piston travels within the main cylinder toward the main cylinder head, thus decreasing the available volume of fluid in the main cylinder and auxiliary chambers above the piston's head, and increasing the spring rate. This increase of the suspension's spring rate may be begun at any stage in the travel, and at a uniform or non-uniform rate, to suit the requirements of the vehicle according to the positioning of the cylinder wall ports. The piston is positioned after the vehicle is loaded and unloaded by admitting fluid under pressure into the main cylinder and its auxiliary chambers sufficient to force the piston to a predetermined position. By this positioning, the piston is permitted its full travel toward the main cylinder head, under any loading conditions.

This positioning for each and all of the suspension units may be accomplished automatically. In the embodiment shown, the leveling means comprise a leveling valve mounted on each suspension unit, and connected to a master valve, in such a way that all of the units are positioned automatically whenever the shaft of the master valve is depressed by the operator.

Considering first the suspension units, and referring to the drawings, particularly to Figures 1 and 2, 1 represents a piston sliding in a cylinder 2. The cylinder 2 is equipped with ports 4, leading to auxiliary chambers 5. Oil pans 400 are provided to prevent accumulation of oil in the chambers. The piston 1 is provided with a bellows seal 3, packing or rings 6, a head 7, bracket 8, for connecting the piston to the vehicle's wheels or axles, and vent 80. Cylinder 2 is connected to the body of the vehicle by means of hanger 9. Although the piston 1 has been described as connected to the wheels or axle of the vehicle, and the cylinder to the body, the device may be inverted. Ports 10, 11, 12, 13, 70 and 71, and tube 140, are concerned with the leveling operation, and will be described in connection with the leveling valve and master control valve to which they are connected.

In operation, where a plurality of suspension units are used, pressure is supplied to the suspension units from an external source, preferably in the manner and by the devices hereinafter described, to level the individual suspension units. When the unsprung mass to which a suspension unit is attached is displaced upwardly toward the sprung portion of the vehicle to which it is attached, the piston 1 travels toward the head of cylinder 2 at a rate which may be so fixed as to be linearly proportional to the force acting upon it through what may be called its normal operating range. As the piston travels toward the cylinder head, the cylinder ports 4 are successively obstructed so that the total volume of fluid available above the head of the piston is decreased by the volume of the auxiliary chambers so cut off. By positioning the ports and by providing the auxiliary chambers of the capacity as indicated in Figure 2, travel characteristics similar to those indicated in the graph, Figure 9, may be obtained.

The leveling valve 14 is shown in detail in Figures 4 and 5, and in the embodiment shown consists of two sections 15 and 16, together with end caps 17 and 18. In the face of section 15 which lies adjacent section 16 there is provided a cavity defining a main chamber 25. A further cavity, communicating with the cavity 25, is provided in the section 15, and is herein denominated the exhaust chamber 26. Section 16 of the valve is provided with a cavity defining a supplemental chamber 24, arranged to communicate directly with main chamber 25. The sections 15 and 16 are counterbored to receive the stem parts of valves 19 and 20, the former of which is provided with a head 190, arranged to control the communication between main chamber 25 and supplemental chamber 24. Likewise, valve 20 is provided with a head 200, arranged to control the communication between main chamber 25 and exhaust chamber 26. The valves 19 and 20 are provided with springs 19' and 20' respectively to bias them in the direction such as to close the passage between the main chamber 25 and the respective chambers 24 and 26.

Main chamber 25 is provided with a port 100, adapted to be connected to the port 10 of the cylinder 2. The valve is provided with a header 29, arranged to be connected with a source of high pressure fluid during the leveling operation hereafter described. Suitable ducts 21 and 22 are provided to supply the high pressure fluid from header 29 to supplemental chamber 24. Duct 21 is provided with a constriction 23, and therebeyond duct 210 extends so as to supply the high pressure fluid to the enlarged end 199 of valve 19.

From the chamber adjacent the enlarged end of valve 19, a port 250 extends to a spring biased check valve 30, and therebeyond a conduit 251 extends to and communicates with port 11 of the cylinder 2.

A hole 28 extends entirely through section 15 of the valve and provides merely a section of conduit not operatively associated with the moving parts of the leveling valve. The hole 28 is connected by a conduit 60 to port 13 of the cylinder 2.

Exhaust chamber 26 is vented to the exterior of the valve 14 through a passage 260 controlled by a spring biased valve 27.

Figure 6:
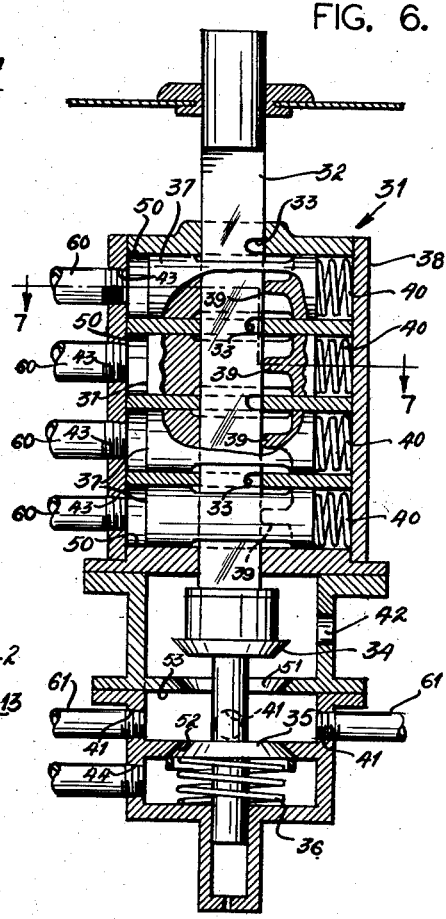
Figure 6 is a vertical section through a master control valve as shown diagrammatically in Figure 8.
Figure 8:
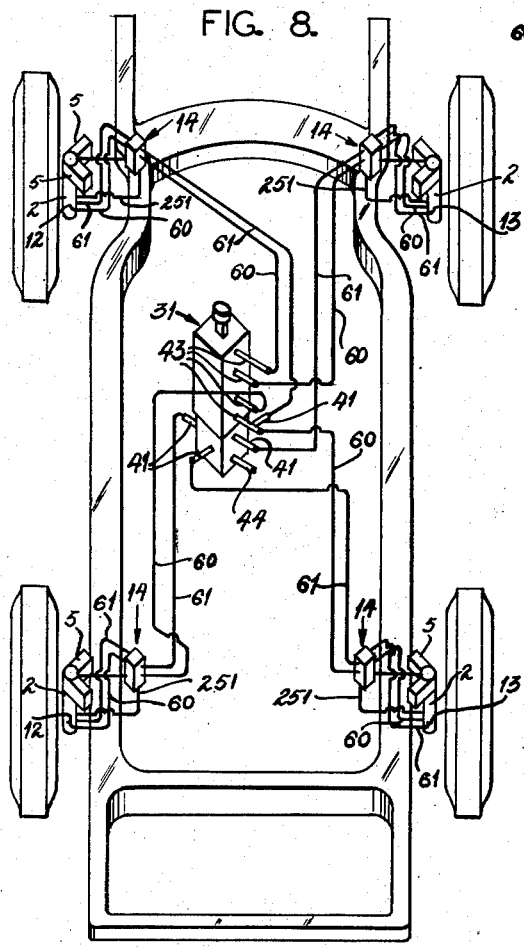
Figure 8 is a diagrammatic view showing the connection between the master control valve and individual leveling valves and suspension units.
Figure 7:
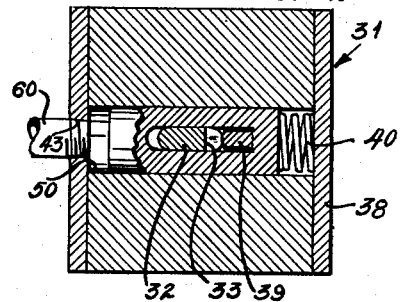
Figure 7 is a sectional view taken along line 7—7 of Figure 6.

Referring to Figures 6 and 7, an illustrative embodiment of master valve for concurrently operating all of the individual leveling valves is shown. A shaft 32 is arranged to slide in casing 38. Shaft 32 is provided along its length with recesses 33, and at its lower portion with exhaust valve head 34 and pressure valve head 35. The shaft 32 is biased upwardly by a spring 36. Pistons 37 slide in cylinders 50 within casing 38. Pistons 37 are slotted, so that the shaft 32 passes within the slots, and are provided with projections 39 within the slots, adapted, when the pistons 37 are forced forward by springs 40, to engage the recesses 33 in the shaft.

The number of pistons 37 corresponds with the number of suspension units to be controlled. Cylinders 50 are provided at the ends opposite springs 40 with ports 43. Each of ports 43 is in turn connected by means of conduit 60, through the hole 28 in the leveling valve 14, to a port 13 of individual cylinder 1.

Chamber 53, formed between valve seats 51 and 52, is provided with ports 41, the number of which corresponds with the number of suspensions to be controlled. These ports 41 communicate, by means of conduit 61, with headers 29 of individual leveling valves 14.

Port 44 is connected to the source of fluid pressure.

Vent 42 is open to the atmosphere.

Except during the actual leveling operation, the leveling means are inactive. Thus when shaft 32 of master control valve 31 is in its normal position, with pressure valve head 35 seated in valve seat 52, and exhaust valve head 34 unseated from valve seat 51, fluid pressure from port 44 is cut off from the system. Conduit 61, leading to the various suspension units, is vented through vent 42, so that in the leveling valve of each suspension unit, the header 29, and passages 21 and 210 are at atmospheric pressure. The pressure within the leveling valve main chamber 25 is substantially the same as that within suspension unit cylinder 2, so that leveling valves 19 and 20 remain closed. Check valve 30 prevents the escape of fluid pressure from cylinder 2 through port 11 and conduit 251.

In the leveling operation, shaft 32 is depressed by the operator, seating exhaust valve head 34, and unseating pressure valve head 35. Recesses 33 are engaged by spring-loaded projections 39 to hold the shaft in this depressed position. When the valve heads are in this position, fluid under pressure is admitted through port 44, port seat 52, and through ports 41 to headers 29 in individual valve bodies 14.

Considering now one of the suspension units singly, and assuming that the pressure therein is low, that is, that the piston is too high in the cylinder. The ports 11, 12 and 13 are closed by the piston itself. Since the cross-sectional area of one end of valve 19 is greater than that of the other end, pressure upon the enlarged end 199 moves the head 190 from its seat. High pressure fluid from header 29 is then admitted through passages 21 and 22 to main chamber 25, and thence through ports 100 and 10, to the cylinder 2. When the piston 1 has been pushed down to the point at which ports 12 and 13 are connected by tube 140, high pressure fluid from header 29 flows through conduit 61, port 12, tube 140, port 13, and conduit 60, through the port 43 of one of the cylinders 50, in master valve 31. This "throws" the piston 37 sliding within that cylinder 50 against the force of its spring 40, to disengage that piston's projection 39 from the corresponding slot 33 in shaft 32. If the piston 1 is pushed down to a point at which port 11 is sufficiently uncovered, the high pressure fluid in the duct 210 is admitted to the cylinder 2 through port 250, check valve 30, conduit 251 and port 11. This causes the pressure of the side of the orifice 23 on which duct 210 lies to fall, and the force of the spring 19' and of the pressure on the other side of the orifice are sufficient to close pressure valve 19.

When all of the individual suspensions are leveled, i. e. positioned so that their tubes 140 are aligned with ports 12 and 13, all of the pistons 37 of the master control valve 31 are "thrown." Shaft 32 is then completely released from the projections 39 and is biased to its normal position by spring 36, seating valve head 35 and unseating valve head 34. Ports 41 are then in communication through seat 51 with vent 42, so as to vent all of the conduit 61 from individual suspension units.

Port 12 must be located below the possible travel of the head 7 of piston 1, since this port is connected to the heater 29 of the leveling valve 14, which header is vented to the atmosphere through vent 42 of master valve 32, except during the actual leveling operation described.

Assuming now that the level of the piston 1 is too low in the cylinder 2, that is, that the pressure within cylinder 2 is too high. Port 11 is uncovered. When the master valve is operated to connect the header 29 with the source of high pressure fluid, high pressure fluid is admitted to duct 21, the pressure on the side of constriction 23, on which duct 21 lies, is greater than the pressure on the other side of constriction 23, because of that constriction, since the duct 210 is connected with the interior of the cylinder 2, which is necessarily at a pressure less than that of the high pressure fluid. The exhaust valve 20 is opened while pressure valve 19 (biased by the spring 19' toward the closed position, and urged toward that position by the higher pressure in the duct 21) remains closed. While it is true that fluid under pressure is being admitted to cylinder duct 210, check valve 30, and port 11, the volume of fluid escaping through port 10, chamber 25 and check valve 27, is greater. The excess pressure in the cylinder 2 is thus relieved through port 10, main cavity 25, and exhaust cavity 26. This allows the piston to rise until ports 12 and 13 are connected by tube 140, throwing a control valve piston 37, as previously described, in connection with the operation when the pressure within cylinder 2 is initially too low.

Ports 70 and 71 may be provided to insure that the master control valve does not close until all of the units are level. If the piston in an individual unit, because of a shift in the load or delay in leveling of the other units, rises above or falls below the level position, the pressure in the conduit 60 leading from port 13 to the port 43 of one of the cylinders 50 of the master valve is released into the vented space below the head of the piston 1. With the pressure released, the piston 37 is again urged forward by spring 40 to allow the projection 39 to engage recess 33 in the central shaft 32 of the master control valve 31. Thus each unit must be exactly leveled before the master control valve operates to shut off the flow of fluid to the individual units.

Thus it is seen that a simple, sturdy, improved pneumatic suspension system is provided which provides the comfort of a suspension system having a low spring rate without its normally concomitant disadvantages.

Having thus described the invention, what is claimed and desired to be secured by Letters Patent is:

1. A pneumatic suspension unit comprising a main cylinder having ports in the walls thereof, a plurality of auxiliary chambers, having a greater volume than said main cylinder, communicating only with said main cylinder through said ports, and a piston sliding in said main cylinder and adapted to obstruct said ports successively as it travels toward, and to clear said ports successively as it travels away from, the head of said cylinder.

2. A pneumatic suspension system comprising a main cylinder having ports in the walls thereof, auxiliary chambers communicating with said cylinder through said ports, a piston sliding within said cylinder and a leveling valve connected to said main cylinder through ports in the walls of said cylinder, comprising a valve body containing a passage for compressed air, balanced pressure and exhaust valves slidably positioned within said valve body and communicating with said passage and an orifice in said passage within said valve body and intermediate the ends of the balanced pressure and exhaust valves, said orifice providing a pressure differential sufficient to actuate the said valves upon flow of compressed air through said passage.

3. A pneumatic suspension system for use on wheeled vehicles comprising a plurality of suspension units each comprising a main cylinder having ports in the walls thereof, auxiliary chambers communicating with said cylinder through said ports, a piston sliding within said cylinder; and leveling means for automatically positioning said piston within said cylinder independently of the load thereon comprising individual leveling valves connected to each suspension unit through ports in the walls of the cylinders of said unit, and a master control valve connected to each of said individual suspension units and to each of said leveling valves and adapted to connect all of the said leveling valves with a source of compressed air until the said suspension units have been leveled, and thereupon automatically to disconnect said units from the source of compressed air.

4. In a pneumatic suspension system of the character described, a suspension unit comprising a main cylinder having two groups of ports in the walls thereof, a plurality of auxiliary chambers communicating only with said main cylinder through one group of said ports, a piston sliding in said main cylinder and adapted to obstruct successive auxiliary chamber ports as it travels toward, and to clear said auxiliary chamber ports as it travels away from, the head of said main cylinder, and leveling means connected with said main cylinder through the other group of said ports.

5. In a pneumatic suspension system having a plurality of suspension units, leveling valve units, each of which is connected to one of said suspension units, and a source of high pressure fluid; a master control valve, connected to the source of high pressure fluid and to each of said leveling valve units, comprising a casing, a shaft slidably positioned in said casing and carrying pressure and exhaust valves, said shaft being biased normally toward the position in which said pressure valve is seated and said exhaust valve is unseated, piston means slidably mounted within the said casing and communicating with individual suspension units, said piston means being provided with means for engaging the shaft in the position in which its said pressure valve is unseated and its exhaust valve seated until all the suspension units are leveled, and for releasing said shaft when all of the units are leveled.

6. A leveling valve for use with a suspension unit of the character described, comprising a valve body provided with a main passage having a port for connection with the suspension unit and a header for connection to a source of high pressure fluid; a main chamber within said valve body communicating through an exhaust valve seat with the atmosphere, communicating through a pressure valve seat with the said main passage and provided with a port for connection to said suspension unit; a pressure valve having a stem with an enlarged end and a head intermediate the ends of said stem, said pressure valve being slidably mounted within said valve body in such a way that the head moves within the said main chamber but is biased toward a position in which said head is seated within said pressure valve seat to block the communication between the main passage and the main chamber, both ends of said pressure valve stem communicating with the main passage; an exhaust valve having a stem and a head intermediate the ends of its stem, said exhaust valve being slidably mounted within said valve body in such a way that the head moves within the main chamber but is biased toward a position in which said head is seated within said exhaust valve seat to block the communication between the main chamber and the atmosphere, both ends of said exhaust valve stem communicating with the main passage; and a constriction in said main passage intermediate the points at which the ends of said exhaust and said pressure valves communicate with said main passage and intermediate the points at which said header and the said main passage port communicate with said main passage, said constriction being adapted, upon flow of fluid from said header to said main passage port to produce a pressure differential sufficient to seat said pressure valve and to raise said exhaust valve.

References Cited in the file of this patent

UNITED STATES PATENTS

| Number | Name | Date |
| --- | --- | --- |
| 811,982 | Wilkinson | Feb. 6, 1906 |
| 1,486,911 | Messier | Mar. 18, 1924 |
| 1,974,171 | Bizzarri | Sept. 18, 1934 |